US005879580A

United States Patent [19]

Tsuda et al.

[11] Patent Number: 5,879,580

[45] Date of Patent: *Mar. 9, 1999

[54] FERROFLUID HAVING IMPROVED OXIDATION RESISTANCE

[75] Inventors: Shiro Tsuda, Chiba; Mayumi Takayama, Tokawa-machi, both of Japan

[73] Assignee: Ferrotec Corporation, Tokyo, Japan

[ * ] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,656,196.

[21] Appl. No.: 753,949

[22] Filed: Dec. 3, 1996

Related U.S. Application Data

[63] Continuation-in-part of Ser. No. 356,519, Dec. 15, 1994, Pat. No. 5,656,196.

[51] Int. Cl.[6] ................................ H01F 1/44; C09K 3/00; C09K 15/00

[52] U.S. Cl. ..................................... 252/62.52; 252/62.54

[58] Field of Search ............................. 252/62.52, 62.54, 252/62.51 R

[56] References Cited

U.S. PATENT DOCUMENTS

| | | | |
|---|---|---|---|
| Re. 32,573 | 1/1988 | Furumura et al. | 225/62.51 |
| 3,764,540 | 10/1973 | Khalafalla et al. | 252/62.55 |
| 4,485,024 | 11/1984 | Furumura et al. | 252/62.56 |
| 4,608,186 | 8/1986 | Wakayama et al. | 2522/62.52 |
| 4,624,797 | 11/1986 | Wakayama et al. | 252/62.52 |
| 4,626,370 | 12/1986 | Wakayama et al. | 252/62.52 |
| 4,687,596 | 8/1987 | Borduz et al. | 252/516 |
| 4,701,275 | 10/1987 | Duminy-Kovarik | 252/62.52 |
| 4,701,276 | 10/1987 | Wyman | 252/62.52 |
| 4,812,249 | 3/1989 | Duminy-Kovarik | 252/62.52 |
| 4,846,985 | 7/1989 | Rizvi et al. | 252/47.5 |
| 4,938,886 | 7/1990 | Lindsten et al. | 252/62.51 |
| 5,064,550 | 11/1991 | Wyman | 252/62.51 |
| 5,627,147 | 5/1997 | Hayakawa et al. | 252/62.52 |
| 5,629,274 | 5/1997 | Hayakawa et al. | 252/62.52 |

FOREIGN PATENT DOCUMENTS

| | | |
|---|---|---|
| 8-259986 | 10/1986 | Japan . |
| 2-239603 | 9/1990 | Japan . |
| WO 96/19686 | 6/1996 | WIPO . |

OTHER PUBLICATIONS

Material Safety Data Sheet of Ferrofluidics Corp., Ferrofluid CSG 40 Series (1986). no month.

Material Safety Data Sheet of Ferrofluidics Corp., Ferrofluid APG 500A Series (1986). no month.

Material Safety Data Sheet of Ferrofluidics Corp., Ferrofluid CFF 100X (1990). no month.

Material Safety Data Sheet of Ferrofluidics Corp., Ferrofluid CSG 33 (1990). no month.

Matherial Safety Data Sheet of Ferrofluidics Corp., Ferrofluid CFF 100A (1990). no month.

Material Safety Data Sheet of Nippon Ferrofluidics Corp., Ferrofluid CFF 200A (printed no later than Jun. 16, 1992).

Material Safety Data Sheet of Ferrofluidics Corp., (first page), Ferrofluid VSG 600 Series (1990). no month.

Material Safety Data Sheet of Nippon Ferrofluidics Corp., (first page), Ferrofluid 513A Special (date unavailable).

John Wiley and Sons, "The Technology of Plasticers"(1982). no month.

*Primary Examiner*—Melissa Bonner
*Attorney, Agent, or Firm*—Finnegan, Henderson, Farabow, Garrett & Dunner, L.L.P.

[57] ABSTRACT

The present invention relates to a ferrofluid composition having improved oxidation resistance, which contains a carrier liquid, magnetic particles in a stable colloidal suspension, and from more than about 10% to about 400% by weight of an antioxidant based on the weight of the magnetic particles.

46 Claims, No Drawings

FERROFLUID HAVING IMPROVED OXIDATION RESISTANCE

This application is a continuation-in-part of application Ser. No. 08/356,519, filed Dec. 15, 1994, now U.S. Pat. No. 5,656,196.

BACKGROUND OF THE INVENTION

The present invention relates to a ferrofluid composition having improved oxidation resistance and a method for increasing the gelation time of a ferrofluid.

Super paramagnetic fluids, commonly referred to as ferrofluids, are colloidal suspensions of magnetic particles suspended in a carrier liquid. The magnetic particles are suspended in the carrier liquid by a dispersing agent which attaches to the surface of the magnetic particles to physically separate the particles from each other. Dispersing agents, or dispersants, are molecules which have a polar "head" or anchor group which attaches to the magnetic particle and a "tail" which extends outwardly from the particle surface.

Magnetic fluids have a wide variety of industrial and scientific applications which are known to those skilled in the art. Magnetic fluids can be positioned and held in space, without a container, by a magnetic field. This unique property has led to the use of magnetic fluids as liquid seals which have low drag torque and which do not generate particles during dynamic operation, as conventional lip seals tend to do. Specific uses of magnetic fluids which illustrate the present invention and its advantages include the use of magnetic liquids as components of exclusion seals for computer disk drives, seals and lubricants for bearings, for pressure and vacuum sealing devices, for heat transfer and damping fluids in audio speaker devices and for inertia damping.

In many sealing applications which use a magnetic colloid sealing system, it is particularly advantageous to have a magnetic colloid with the lowest possible viscosity to reduce frictional heating. This, in turn, reduces the temperature of the fluid in the seal and consequently the evaporation rate of the carrier liquid, thereby prolonging the life of the seal. Ideally, magnetic fluids suitable for sealing disk drives for computers have both a low viscosity and a low evaporation rate.

These two physical characteristics of magnetic fluids are primarily determined by the physical and chemical characteristics of the carrier liquid. According to the Einstein relationship, the viscosity of an ideal colloid is:

$$(N/N_0)=1+\alpha\Phi$$

wherein

N is the colloid viscosity;

$N_0$ is the carrier liquid viscosity;

$\alpha$ is a constant; and $\Phi$is the disperse phase volume.

The saturation magnetization (G) of magnetic fluids is a function of the disperse phase volume of magnetic material in the magnetic fluid. In magnetic fluids the actual disperse phase volume is equal to the phase volume of magnetic particles plus the phase volume of the attached dispersant.

The ideal saturation magnetization for a magnetic fluid is determined by the application or the magnetic design.

The higher the magnetic particle content, the higher the saturation magnetization. Also, a set volume % of metal particles in the fluid such as cobalt and iron generates a higher saturation magnetization than the same volume % of ferrite. In other words, saturation magnetization of a fluid is determined by the amount and type of magnetic particles in the fluid.

By way of example, typical saturation magnetization values for: (1) exclusion seals for a hard disk drive are between 200–300, preferably 250 G; (2) vacuum seals for the semiconductor industry are between 300–600, preferably 450; (3) loud speakers are between 100–400, preferably 100; and (4) fluid film bearings for a motor and tester are between 50–300.

Magnetic particle size and size distribution, along with the physical and chemical characteristics of the dispersant, also affect the viscosity and, consequently, the evaporation rate of magnetic fluids.

There are, however, a number of ways that a ferrofluid can lose its effectiveness, such as evaporation of the carrier liquid. Oxidative degradation, which occurs when the fluid is heated in the presence of air, is another problem.

Oxidative degradation of the magnetic particles causes the particles to lose their magnetic character due to the formation on the surface of the particles of a non-magnetic or low magnetic oxide layer. Attempts to solve this problem, i.e., prevent oxidation of the magnetic particles, are described in U.S. Pat. Nos. 4,608,186, 4,624,797 and 4,626,370.

In addition to oxidative degradation of the magnetic particles, oxidative degradation of the dispersant is believed to be another problem associated with the loss of effectiveness of a ferrofluid. Oxidative degradation of the dispersant increases the particle-to-particle attraction within the colloid, resulting in gelation of the magnetic colloid at a much more rapid rate than would occur in the absence of oxidative degradation. Accordingly, there is a need in the art for a ferrofluid having an improved resistance to oxidative degradation of the dispersant to increase the time until gelation occurs.

SUMMARY OF THE INVENTION

Accordingly, the present invention is directed to a ferrofluid composition having an improved oxidation resistance. Additional features and advantages of the invention will be set forth in the description which follows, and in part will be apparent from the description or may be learned from practice of the invention. The advantages of the invention will be realized and attained by the composition particularly pointed out in the written description and claims.

To achieve these and other advantages and in accordance with the purpose of the invention, as embodied and broadly described, the invention provides a ferrofluid composition having improved oxidation resistance, which contains a carrier liquid, magnetic particles in a stable colloidal suspension, and from more than 10% to about 400% by weight of an antioxidant based on the weight of magnetic particles.

There is also provided a method for increasing the gelation time of a ferrofluid, which comprises adding to a ferrofluid from more than 10% to about 400% by weight of an antioxidant based on the weight of magnetic particles.

It is to be understood that both the foregoing general description and the following detailed description are exemplary and explanatory and are intended to provide further explanation of the invention as claimed.

DETAILED DESCRIPTION OF THE INVENTION

A first embodiment of the present invention is directed to a ferrofluid composition which has an improved oxidation resistance. In particular, a first embodiment of the present invention is directed to a ferrofluid comprising a carrier liquid, magnetic particles in a stable colloidal suspension, and from more than 10% to about 400% by weight of an antioxidant based on the weight of the magnetic particles.

Ferrofluids, and methods of making ferrofluids, are generally well-known in the art. U.S. Pat. No. 4,701,276, which is herein incorporated in its entirety by reference, describes ferrofluids and their uses and applications. Ferrofluids generally comprise a carrier liquid and magnetic particles in a stable colloidal suspension.

The carrier liquid used in the ferrofluid of the present invention may be any carrier liquid known by those skilled in the art to be useful for ferrofluids. The carrier liquid may be a polar carrier liquid or a nonpolar carrier liquid. The choice of carrier liquid and amount employed is dependent upon the intended application of the ferrofluid and can be readily determined by the skilled artisan based upon the particular desired characteristics of the final ferrofluid. Suitable carrier liquids are disclosed in U.S. Pat. Nos. 4,938,886 and 5,064,550, which are herein incorporated in their entirety by reference.

Illustrative examples of polar carrier liquids in which stable suspensions of magnetic particles may be formed include any of the ester plasticizers for polymers such as vinyl chloride resins. Such compounds are readily available from commercial sources. Suitable polar carrier liquids include: polyesters of saturated hydrocarbon acids, such as $C_6$–$C_{12}$ hydrocarbon acids; phthalates, such as dioctyl and other dialkyl phthalates; citrate esters; and trimellitate esters, such as tri(n-octyl/n-decyl) esters. Other suitable polar carriers include: phthalic acid derivatives, such as dialkyl and alkylbenzyl orthophthalates; phosphates, such as triaryl, trialkyl or alkylaryl phosphates; and epoxy derivatives, such as epoxidized soybean oil.

Nonpolar carrier liquids useful in the practice of the present invention include hydrocarbon oils, in particular, poly(alpha olefin) oils of low volatility and low viscosity.

Such oils are readily available commercially. For example, SYNTHANE oils produced by Gulf Oil Company having viscosities of 2, 4, 6, 8 or 10 centistokes (cst) are useful as nonpolar carrier liquids in the present invention. A preferred hydrocarbon oil is alkylnaphthalene.

Preferably, the carrier liquid used in the present invention is a polar carrier liquid. In a preferred embodiment, the polar carrier liquid is an ester plasticizer selected from the group consisting of trimellitate ester, polyol ester, and mixtures of diester and trimellitate ester. More preferably, the carrier liquid is a trimellitate triester, which are widely used as plasticizers in the wire and cable industry. Most preferably, the carrier liquid is the trimellitate triester available from Aristec Chemical Company under the trade name PX336.

The ferrofluids according to the present invention may contain any magnetic particle suitable for use in ferrofluids, including metal particles and metal alloy particles. Suitable magnetic particles for use in the present ferrofluid include ferrites such as magnetite and MnZn-based ferrites, gamma iron oxide, chromium dioxide, and various metallic alloys. Preferably, the magnetic particles are magnetite ($Fe_3O_4$), gamma iron oxide ($Fe_2O_3$), and MnZn based ferrites. More preferably, the magnetic particles are magnetite. Those skilled in the art are familiar with procedures for making magnetite and other suitable magnetic particles.

The amount of magnetic particles employed in the inventive ferrofluid is dependent upon the intended use of the ferrofluid, and the optimal amount can be readily determined by one of skill in the art. Preferably, the amount of magnetic particles is from about 1% to about 20% by volume of the ferrofluid. More preferably, the amount of magnetic particles is from about 1% to about 10% by volume of the fluid, most preferably from about 3% to about 5% by volume of the fluid.

Magnetic particles, such as magnetite, in the ferrofluid preferably have an average magnetic particle diameter of between 80 Å and 90 Å, although particles having a larger or smaller magnetic particle diameter may be used as appropriate. One skilled in the art may readily determine the appropriate particle size based upon the intended application of the ferrofluid and other considerations.

The magnetic particles used in the present ferrofluid are coated with at least one dispersant to form stable colloidal suspensions of the magnetic particles in relatively high molecular weight nonpolar and polar carrier liquids. Suitable dispersants for use in the present ferrofluid are disclosed in U.S. Pat. Nos. 4,938,886 and 5,064,550, incorporated by reference above. Additionally, according to the invention, the dispersant may be selected from the group consisting of acid terminated poly (12-hydroxystearic acid) dispersants of the Formula I:

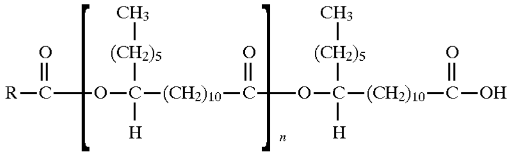

where "R" is selected from the group consisting of alkyls, aralkyls, and aryls, substituted or unsubstituted, and "n" is an integer from 0 to 4, or mixtures thereof where "R" and "n" may be the same or different.

Preferably, "R" is a $C_{22}$ or less substituted or unsubstituted alkyl and "n" is an integer from 0 to 3. More preferably, "R" is a $C_{17}$ or less linear or branched alkyl and "n" is an integer from 0 to 2.

The acid terminated poly (12-hydroxystearic acid) is produced, for example, by the condensation polymerization of 12-hydroxystearic acid and a monobasic organic acid such as behenic acid, arachidic acid, stearic acid, oleic acid, linoleic acid, palmitic acid, lauric acid, 2-ethyl hexanoic acid, benzoic acid, p-toluic acid, and the like. A poly (12-hydroxystearic acid) dispersant terminated with isostearic acid, and produced as indicated above, has been found to be an effective dispersant for the present invention.

In accordance with the present invention, the acid terminated poly (12-hydroxystearic acid) effectively disperses magnetic particles in a polar ester carrier liquid without the use of a second dispersant, and results in a highly stable magnetic colloid having excellent resistance to oxidative degradation.

One skilled in the art is familiar with dispersants and how to incorporate them into ferrofluids. Preferably, the dispersant has a carboxyl group as the "head" or anchor group.

The inventive ferrofluid also contains an antioxidant. The antioxidant may be any antioxidant known to those skilled in the art, including hindered phenols and sulfur-containing compounds. One skilled in the art may readily ascertain the suitability of a given antioxidant simply by adding the antioxidant to the ferrofluid and seeing if the gelation time of the fluid is increased relative to that of the fluid without the antioxidant.

Preferably, the antioxidant is an aromatic amine. More preferably, the antioxidant is an alkylaryl amine. Most preferably, the antioxidant is an alkyl diphenylamine, such as the alkyl diphenylamine L-57 available from Ciba-Geigy and OA502 available from Witco.

The antioxidant may be used in any amount effective to increase the gelation time of a ferrofluid with respect to the gelation time of that fluid without the antioxidant. Preferably, the amount of antioxidant is from more than 10% to about 400% by weight of the magnetic particles, more preferably from about more than 10% to about 200% by weight of the magnetic particles. Most preferably, the amount of the antioxidant employed is from about more than 10% to about 100% by weight of the magnetic particles.

The inventive ferrofluid may be prepared by any of the methods known to those skilled in the art for preparing ferrofluids. Preferably, the antioxidant to be used is simply added to a known ferrofluid, such as the ferrofluid CFF200A available from Ferrotec® Corporation, in an effective amount.

The following examples of the inventive composition are merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

EXAMPLE 1

The following example illustrates the effects of an antioxidant on gel time of the ferrofluid CFF200A (Ferrotec®).

The ferrofluid containing the desired quantity of antioxidant OA502 was placed in a glass tube having an inside diameter of 11.8 mm, and outside diameter of 15.0 mm and a length of 8.3 mm. A sufficient volume of ferrofluid was used such that the tube contained 3 mm of material.

The tube was then placed in a hole drilled in an aluminum plate (15.8 cm×15.8 cm×4.0 mm), the hole being sized such that the tube fit snugly. The aluminum plate was then placed in an oven at a controlled temperature of 175±2° C. The temperature of the sample was 156±5° C.

The tube containing the ferrofluid was periodically removed from the oven, cooled rapidly, and examined for signs of gel formation. A small magnet was placed at the meniscus of the fluid in the tube. When the material was no longer attracted to the portion of the magnet held above the meniscus, the fluid was considered to have gelled.

Repeated experiments utilizing the same ferrofluid composition at the same temperature showed that gel times were repeatable to ±20%. The results are presented in Table 1 below.

TABLE 1

The effectiveness of D-1 on CFF 200A

| Wt % of D-1 to the weight of magnetic fluid | Wt % of D-1 to the weight of magnetic particles | Gel time at 156 ± 5° C. (hours) |
|---|---|---|
| 0 | 0 | 285 |
| 2 | 6.6 | 470 |
| 5 | 16.5 | 610 |
| 10 | 33.0 | 780 |
| 20 | 66.0 | 910 |
| 30 | 99.0 | 780 |
| 40 | 132.0 | 620 |
| 50 | 165.0 | 380 |

D-1: Alkyldiphenylamine, Witco OA 502

EXAMPLE 2

This example illustrates the effectiveness of an antioxidant on a 450 G magnetic fluid. A magnetic fluid was prepared by the following procedure.

Preparation of Acid Terminated Poly (12-hydroxystearic acid) Dispersant

The general procedure described below was used to prepare the dispersants.

A three necked round bottom flask placed in a heating mantel was equipped with a mechanical stirrer, a Dean-Stark trap filled with xylene and topped by a condenser, and a glass tube through which an inert gas such as nitrogen or argon is introduced to blanket the reaction mixture. The organic acids are introduced into the flask with a quantity of xylene equal to about 10% of the weight of the organic acids and the inert gas flow is started, the mixture is heated, and when the organic acids have melted the stirrer is started. Heating and stirring the mixture is continued until water is no longer collected in the Dean-Stark trap. The solution of the dispersant is then allowed to cool under an inert gas blanket.

Preparation of Magnetic Colloids

Utilizing the general procedure and apparatus described above, a dispersant was prepared from 706 g of technical grade 12-hydroxystearic acid [80–90% 12-hydroxystearic acid, remainder monobasic fatty acid], 462 g of isostearic acid and 100 cc of xylene. 36 cc of water should have been recovered, but only 14 cc of water was recovered, even though heating and stirring the mixture was continued until no water was collected in the trap, because water condensed on the inner wall of the equipment and some water might have been removed with the nitrogen carrier gas. The dispersant was calculated to have a molecular weight of 566.

A slurry of magnetite was prepared by adding a solution of 417 g of ferrous sulfate heptahydrate and 705 cc of 42° Be ferric chloride solution in 1500 cc of water to a vigorously stirred mixture of 600 cc of water and 900 cc of 26° Be ammonia solution. The mixture was stirred for 10 minutes.

A quantity of 260 g of the dispersant was dissolved in 3000 cc of heptane, the dispersant solution was added to the magnetic slurry with stirring and the mixture was stirred for 3 minutes. 6000 cc of acetone was added to the above mixture and the mixture was stirred for 3 minutes. The mixture was left alone for 10 hours. The supernatant was removed and the mass of coated particles at the bottom was collected into a 3000 cc beaker. The particles sticking on the wall and at the bottom of the container were rinsed with heptane to collect all the coated particles and put in the beaker. About 2000 cc of heptane including heptane for rinsing was added in the beaker and the particles were dispersed in heptane with stirring. The heptane based magnetic fluid was heated at 80° C., residual water and acetone and some amount of heptane were evaporated and the heptane based magnetic fluid was cooled. It was then filtered through coffee filter paper and 1000 cc of 240 G magnetic fluid was obtained.

The heptane based magnetic fluid was poured into a 7000 cc alumilite [$\gamma Al_2O_3.H_2O$ coated aluminum] pan and 2000 cc of acetone was added in the pan with stirring. The particles were flocked and collected at the bottom by putting a large magnet under the pan. The supernatant was siphoned out, 1500 cc of heptane was added in the pan and the particles were redispersed in heptane with stirring. This acetone flocking and heptane redispersing process was repeated 10 times. Then the acetone flocking was repeated twice and the particles were dispersed in 2000 cc of heptane. The heptane based magnetic fluid was heated to 80° C. to remove residual acetone, cooled and filtered through coffee filter paper. 1800 cc of 129 G magnetic fluid was obtained.

The heptane based magnetic fluid was divided into 6 separate 300 cc beakers. A quantity of carrier oil and antioxidant was added in each beaker with stirring, the magnetic fluid was heated to remove heptane and the saturation magnetization of the oil based magnetic fluid was adjusted to be 450 G with the carrier oil and the antioxidant. The composition of the magnetic fluid is as follows.

Magnetic particles
  Magnetite
Dispersant
  The number "n" in Formula I is 0 and "R" is $C_{17}H_{35}$
Carrier Liquid
  Hindered ester of trimethylol propane, available from Unichema International as "Priolube 3970"
Antioxidant
  Alkyldiphenylamine, available from Witco Corp. as OA 502

Gel time for several 450 G fluids with different amounts of antioxidant were measured by the following gel test. This gel test was used for Examples 2–6.

A ferrofluid was placed in a glass tube having an inside diameter of 12.9 mm, an outside diameter of 15.0 mm, and a length of 10.0 mm. A sufficient volume of ferrofluid was used so that the tube contained 3 mm of material.

The tube was then placed in a hole drilled in a first aluminum plate (110 mm×110 mm×10 mm), the hole being sized such that the tube fit snugly. The first aluminum plate was then placed on a second aluminum plate (220 mm×220 mm×20 mm) that was maintained at a constant temperature in an oven at a controlled temperature of 150± 2° C. or 130±2° C. The second aluminum plate is kept in the oven to hold the first aluminum plate.

The tube containing the ferrofluid was periodically removed from the oven when it had cooled, and examined for signs of gel formation. A small magnet was placed at the meniscus of the fluid in the tube. When the material was no longer attracted to the portion of the magnet held above the meniscus, the fluid was considered to have gelled.

Repeated experiments utilizing the same ferrofluid composition at the same temperature showed that gel times were repeatable to within ±20%.

Table 2 shows the results of gel time for Example 2 samples at 130° and 150° C.

TABLE 2

The effect of D-1 on 450G Magnetic Fluid

| Vol % of D-1 to the volume of magnetic fluid | Wt % of D-1 to the weight of magnetic fluid | Wt % of D-1 to the weight of magnetic particles | Gel time at 150° C. (hr) | Gel time at 130° C. (hr) |
|---|---|---|---|---|
| 0 | 0 | 0 | 45.25~70.00 | 167.50~234.75 |
| 2.98 | 2.04 | 5 | 104.75~129.50 | 496.75~564.00 |
| 5.95 | 4.08 | 10 | 154.50~175.25 | 674.50~723.50 |
| 11.9 | 8.16 | 20 | 220.50~245.25 | 1034.50~1054.00 |
| 23.8 | 16.3 | 40 | 289.50~315.25 | 1125.75~1149.25 |
| 59.5 | 40.8 | 100 | 220.50~245.25 | 629.25~674.50 |

D-1: Alkyldiphenylamine, Witco OA 502

EXAMPLE 3

The purpose of this experiment was to illustrate the effectiveness of antioxidant on 600 G magnetic fluid. A magnetic fluid was prepared by the procedure described in Example 2 above. The composition of the magnetic fluid is as follows:

Magnetic particles
  Magnetite
Dispersant
  The number of "n" in Formula I is 0 and "R" is $C_{17}H_{35}$
Carrier liquid
  Hindered ester of trimethylol propane, available from Unichema International as "Priolube 3970"
Antioxidant
  Alkyldiphenylamine, available from Witco Corp. as OA 502.

The saturation magnetization of the magnetic fluids were adjusted to be 600 G with the carrier liquid and the antioxidant. Gel times for several 600 G fluids with different amounts of the antioxidant were measured.

Table 3 shows the results of gel time at 130 and 150° C.

TABLE 3

The effect of D-1 on 600G Magnetic Fluid

| Vol % of D-1 to the volume of magnetic fluid | Wt % of D-1 to the weight of magnetic fluid | Wt % of D-1 to the weight of magnetic particles | Gel time at 150° C. (hr) | Gel time at 130° C. (hr) |
|---|---|---|---|---|
| 0 | 0 | 0 | 41.25~65.25 | 156.74~188.15 |
| 5.21 | 3.22 | 6.58 | 156.74~188.15 | 426.88~447.54 |
| 10.4 | 6.49 | 13.2 | 156.74~188.15 | 569.86~599.36 |
| 20.8 | 13.0 | 26.3 | 208.65~231.48 | 670.35~694.01 |
| 31.3 | 19.5 | 39.5 | 208.65~231.48 | 670.35~694.01 |
| 52.1 | 32.5 | 65.8 | 156.74~188.15 | 426.88~447.54 |

D-1: Alkyldiphenylamine, Witco OA 502

EXAMPLE 4

The purpose of this experiment is to illustrate the effectiveness of an antioxidant on a magnetic fluid using MnZn ferrite as the magnetic particles. Magnetic fluid that uses MnZn ferrite as the magnetic particles, and is available from Sigma Hi-Chemical Inc. as A-300, was diluted with alkylnaphthalene oil as the carrier liquid and alkyldiphenylamine, available from Witco Corp. as OA 502, as the antioxidant, to have a saturation magnetization of 165 G. Gel times for several 165 G fluids with different amounts of the antioxidant were measured.

Table 4 shows the results of gel time at 130 and 150° C.

TABLE 4

The effect of D-1 on 165G Magnetic Fluid Using MnZn Ferrite

| Vol % of D-1 to the volume of magnetic fluid | Wt % of D-1 to the weight of magnetic fluid | Wt % of D-1 to the weight of magnetic particles | Gel time at 150° C. (hr) | Gel time at 130° C. (hr) |
|---|---|---|---|---|
| 0 | 0 | 0 | 21.75~51.00 | 22.50~119.00 |
| 1.21 | 1.06 | 5 | 21.75~51.00 | 141.25~164.25 |
| 2.42 | 2.12 | 10 | 51.00~68.25 | 190.00~210.00 |
| 4.83 | 4.23 | 20 | 51.00~68.25 | 238.25~265.75 |
| 9.67 | 8.44 | 40 | 68.25~88.75 | 296.00~319.75 |
| 24.2 | 20.9 | 100 | 111.75~137.50 | 590.00~610.75 |
| 48.3 | 41.3 | 200 | 111.75~137.50 | 479.75~505.00 |

D-1: Alkyldiphenylamine, Witco OA 502

EXAMPLE 5

The purpose of this experiment is to see the effectiveness of antioxidant on a 450 G ferrofluid CFF 100A. CFF 100A is commercially available from Ferrotec Corporation. Its saturation magnetization as sold is 250 G but the saturation magnetization for this experiment was adjusted to be 450 G with a diester/triester carrier oil and an alkyldiphenylamine antioxidant available from Witco Corp. as OA 502. Gel times for several 450 G fluids with different amounts of the antioxidant were measured.

Table 5 shows the results of gel time at 130° C.

TABLE 5

The Effectiveness of D-1 on 450 G of CFF 100A

| Vol. % of D-1 to the volume of magnetic fluid | Wt % of D-1 to the weight of magnetic fluid | Wt % of D-1 to the weight of magnetic particles | Gel time at 130° C. (hours) |
|---|---|---|---|
| 0 | 0 | 0 | 74.2–90.9 |
| 2.1 | 1.4 | 3.4 | 115–138 |
| 5.2 | 3.5 | 8.6 | 115–138 |
| 10.4 | 6.9 | 17.2 | 138–161 |
| 20.8 | 13.8 | 34.3 | 161–184 |
| 31.3 | 20.8 | 51.5 | 232–256 |
| 52.1 | 34.7 | 85.8 | 232–256 |

D-1: Alkyldiphenylamine, Witco OA 502

EXAMPLE 6

The purpose of this experiment is to illustrate the effectiveness of an antioxidant on a magnetic fluid based on poly α olefin oil. APG 800 series magnetic fluid whose base oil is poly α olefin oil is commercially available from Ferrotec Corporation. Its saturation magnetization range is from 100 G to 325 G but the saturation magnetization of magnetic fluids for this experiment was adjusted to be 100 G or 200 G with the carrier oil and an alkyldiphenylamine antioxidant available from Witco Corp. as OA 502. Gel times for several 100 G and 200 G fluids with different amounts of antioxidant were measured.

Tables 6-1 to 6-4 show the results of gel times at 150

TABLE 6-1

The Effectiveness of D-1 on 100 G/200 cP of APG 812

| Vol. % of D-1 to the volume of magnetic fluid | Wt % of D-1 to the weight of magnetic fluid | Wt % of D-1 to the weight of magnetic particles | Gel time at 150° C. (hours) |
|---|---|---|---|
| 0 | 0 | 0 | 253–276 |
| 2.1 | 2.1 | 16.3 | 456–477 |
| 5.2 | 5.2 | 40.7 | 569–592 |
| 10.4 | 10.3 | 81.3 | 688–712 |
| 20.8 | 20.0 | 162.6 | 688–712 |

D-1: Alkyldiphenylamine, Witco OA 502

TABLE 6-2

The Effectiveness of D-1 on 100 G/4000 cP of APG 820

| Vol. % of D-1 to the volume of magnetic fluid | Wt % of D-1 to the weight of magnetic fluid | Wt % of D-1 to the weight of magnetic particles | Gel time at 150° C. (hours) |
|---|---|---|---|
| 0 | 0 | 0 | 276–298 |
| 2.1 | 2.0 | 16.3 | 456–477 |
| 5.2 | 5.0 | 40.7 | 569–592 |
| 10.4 | 9.9 | 81.3 | 456–477 |
| 20.8 | 19.4 | 162.6 | 456–477 |

D-1: Alkyldiphenylamine, Witco OA 502

TABLE 6-3

The Effectiveness of D-1 on 200 G/500 cP of APG 833

| Vol. % of D-1 to the volume of magnetic fluid | Wt % of D-1 to the weight of magnetic fluid | Wt % of D-1 to the weight of magnetic particles | Gel time at 150° C. (hours) |
|---|---|---|---|
| 0 | 0 | 0 | 253–276 |
| 2.1 | 1.9 | 8.1 | 320–337 |
| 5.2 | 4.6 | 20.3 | 320–337 |
| 10.4 | 9.1 | 40.7 | 382–406 |
| 20.8 | 18.2 | 81.3 | 529–568 |

D-1: Alkyldiphenylamine, Witco OA 502

TABLE 6-4

The Effectiveness of D-1 on 200 G/4000 cP of APG 840

| Vol. % of D-1 to the volume of magnetic fluid | Wt % of D-1 to the weight of magnetic fluid | Wt % of D-1 to the weight of magnetic particles | Gel time at 150° C. (hours) |
|---|---|---|---|
| 0 | 0 | 0 | 230–253 |
| 2.1 | 1.8 | 8.1 | 382–406 |
| 5.2 | 4.5 | 20.3 | 382–406 |
| 10.4 | 9.0 | 40.7 | 406–430 |
| 20.8 | 17.9 | 81.3 | 382–406 |

D-1: Alkyldiphenylamine, Witco OA 502

Although preferred embodiments of the invention are described herein in detail, it will be understood by those skilled in the art that variations may be made thereto without departing from the spirit of the invention or the scope of the appended claims.

What is claimed is:

1. A ferrofluid composition comprising a nonpolar carrier liquid, magnetic particles in stable colloidal suspension, and from more than 10% to about 400% by weight of an antioxidant based on the weight of the magnetic particles to improve the ferrofluid's resistance to gelation.

2. The ferrofluid of claim 1, wherein the antioxidant is present in an amount of from more than 10% to about 200% by weight.

3. The ferrofluid of claim 1, wherein the antioxidant is present in an amount of from more than 10% to about 100% by weight.

4. The ferrofluid of claim 1, wherein the antioxidant is an aromatic amine.

5. The ferrofluid of claim 4, wherein the antioxidant is an alkylaryl amine.

6. The ferrofluid of claim 5, wherein the antioxidant is an alkyldiphenylamine.

7. The ferrofluid of claim 1, wherein the carrier liquid is a hydrocarbon oil.

8. The ferrofluid of claim 7, wherein the carrier liquid is a poly(alpha olefin) oil.

9. The ferrofluid of claim 7, wherein the hydrocarbon carrier liquid is an alkylnaphthalene.

10. The ferrofluid of claim 1, wherein the magnetic particles are magnetite particles.

11. The ferrofluid of claim 1, further comprising at least one dispersant.

12. The ferrofluid of claim 1, wherein the magnetic particles are MnZn ferrite particles.

13. A method of improving the resistance to oxidative degradation of a ferrofluid comprising a non polar carrier liquid and magnetic particles in stable colloidal suspension, which comprises adding to the ferrofluid from more than 10% to about 400% by weight of an antioxidant based on the weight of the magnetic particles to inhibit oxidation and increase the time required for gelation of the ferrofluid.

14. The method of claim 13, wherein the antioxidant is added to the ferrofluid in an amount of from more than 10% to about 200% by weight.

15. The method of claim 13, wherein the antioxidant is an alkyl diphenylamine.

16. The method of claim 13, wherein the magnetic particles are magnetite particles.

17. The method of claim 13, further comprising the step of adding at least one dispersant.

18. The method of claim 13, wherein the carrier liquid is a hydrocarbon carrier liquid.

19. The method of claim 18, wherein the hydrocarbon carrier liquid is an alkylnaphthalene.

20. The method of claim 13, wherein the magnetic particles are MnZn ferrite particles.

21. The method of claim 13, wherein the carrier liquid is a poly(alpha olefin) oil.

22. The method of claim 13, wherein the antioxidant is added to the ferrofluid in an amount of from more than 10% to about 100% by weight.

23. The method of claim 13, wherein the antioxidant is an aromatic amine.

24. The method of claim 13, wherein the antioxidant is an alkylaryl amine.

25. A ferrofluid composition comprising a polar carrier liquid, magnetic particles in stable colloidal suspension, and from about 20% to about 200% by weight of an antioxidant based on the weight of the magnetic particles to improve the ferrofluid's resistance to gelation.

26. The ferrofluid of claim 25, wherein the carrier liquid is an ester plasticizer.

27. The ferrofluid of claim 26, wherein the carrier liquid is a trimellitate triester.

28. The ferrofluid of claim 25, wherein the carrier liquid is an ester plasticizer selected from the group consisting of trimellitate ester, polyol ester, and mixtures of diester and trimellitate ester.

29. The ferrofluid of claim 25, wherein the antioxidant is present in an amount of from about 20% to about 100% by weight.

30. The ferrofluid of claim 25, wherein the antioxidant is an aromatic amine.

31. The ferrofluid of claim 25, wherein the antioxidant is an alkylaryl amine.

32. The ferrofluid of claim 25, wherein the antioxidant is an alkyldiphenylamine.

33. The ferrofluid of claim 25, wherein the magnetic particles are magnetite particles.

34. The ferrofluid of claim 25, further comprising at least one dispersant.

35. The ferrofluid of claim 25, wherein the magnetic particles are MnZn ferrite particles.

36. A method of improving the resistance to oxidative degradation of a ferrofluid comprising a polar carrier liquid and magnetic particles in stable colloidal suspension, which comprises adding to the ferrofluid from about 20% to about 200% by weight of an antioxidant based on the weight of the magnetic particles to inhibit oxidation and increase the time required for gelation of the ferrofluid.

37. The method of claim 36, wherein the carrier liquid is a trimellitate triester.

38. The method of claim 36, wherein the carrier liquid is an ester plasticizer selected from the group consisting of trimellitate ester, polyol ester, and mixtures of diester and trimellitate ester.

39. The method of claim 36, wherein the carrier liquid is an ester plasticizer.

40. The method of claim 36, wherein the antioxidant is added to the ferrofluid in an amount of from about 20% to about 100% by weight.

41. The method of claim 36, wherein the antioxidant is an aromatic amine.

42. The method of claim 36, wherein the antioxidant is an alkylaryl amine.

43. The method of claim 36, wherein the antioxidant is an alkyldiphenylamine.

44. The method of claim 36, wherein the magnetic particles are magnetite particles.

45. The method of claim 36, further comprising the step of adding at least one dispersant.

46. The method of claim 36, wherein the magnetic particles are MnZn ferrite particles.

* * * * *